United States Patent [19]

Haubs et al.

[11] Patent Number: 5,152,894
[45] Date of Patent: Oct. 6, 1992

[54] SEMIPERMEABLE MEMBRANE MADE FROM A HOMOGENEOUSLY MISCIBLE POLYMER BLEND

[75] Inventors: Michael Haubs, Bad Kreuznach; Willi Kreuder, Mainz; Claus-Peter Krieg, Frankfurt am Main; Juergen Wildhardt, Huenstetten-Wallrabenstein, all of Fed. Rep. of Germany

[73] Assignee: Hoechst Aktiengesellschaft, Frankfurt am Main, Fed. Rep. of Germany

[21] Appl. No.: 733,377

[22] Filed: Jul. 22, 1991

Related U.S. Application Data

[63] Continuation of Ser. No. 470,211, Jan. 25, 1990, abandoned.

[30] Foreign Application Priority Data

Feb. 2, 1989 [DE] Fed. Rep. of Germany ....... 3903098

[51] Int. Cl.$^5$ ...................... B01D 71/28; B01D 71/56
[52] U.S. Cl. ............................... 210/500.38; 210/490; 210/500.42
[58] Field of Search ............... 210/490, 500.38, 500.42

[56] References Cited

U.S. PATENT DOCUMENTS

| | | | |
|---|---|---|---|
| 3,526,588 | 9/1970 | Michaels et al. | 210/500.42 X |
| 3,615,024 | 10/1971 | Michaels | 210/490 |
| 4,051,300 | 9/1977 | Klein et al. | 428/398 |
| 4,229,291 | 10/1980 | Walch et al. | 210/23 F |
| 4,720,343 | 1/1988 | Walch et al. | 210/500.28 |
| 4,891,135 | 1/1990 | Haub et al. | 210/500.38 |
| 4,900,443 | 2/1990 | Wrasidlo | 210/500.38 X |
| 4,906,375 | 3/1990 | Heilmann | 210/500.23 |
| 4,935,141 | 6/1990 | Buck et al. | 210/500.38 |

FOREIGN PATENT DOCUMENTS

| | | | |
|---|---|---|---|
| 0077691 | 4/1983 | European Pat. Off. | 210/500.38 |
| 0176992 | 4/1986 | European Pat. Off. | 210/500.38 |
| 0219878 | 4/1987 | European Pat. Off. | |
| 0228072 | 7/1987 | European Pat. Off. | |
| 58-058106 | 4/1983 | Japan | 210/500.38 |
| 61-271006 | 12/1986 | Japan | 210/500.38 |

OTHER PUBLICATIONS

W. Pusch et al., "Synthetic Membranes: State of the Art", Desalination, 35 (1980) pp. 5-20.
Robert E. Kesting, "Synthetic Polymeric Membranes"; 2nd Ed., 1985, pp. 237-286.

*Primary Examiner*—Robert Spitzer
*Attorney, Agent, or Firm*—Foley & Lardner

[57] ABSTRACT

A semipermeable membrane is described which comprises a homogeneously miscible polymer blend of an aromatic polyamide and polyvinylpyrrolidone. The aromatic polyamide is in particular formed of recurrent units of the formula I:

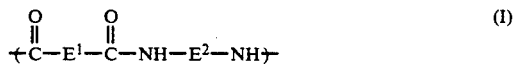

(I)

wherein $E^1$ and $E^2$ are identical or different and are selected from the groupings

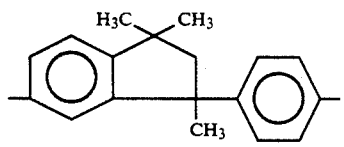

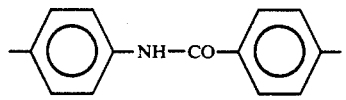

—$AR^1$—, and
—$AR^1$—X—$AR^2$—, where $AR^1$ and $Ar^2$ are the same or different 1,2-phenylene, 1,3-phenylene or 1,4-phenylene groups which may be substituted by $(C_1-C_6)$-alkyl, $(C_1-C_6)$-alkoxy, —$CF_3$ or halogen and X denotes a) a direct bond or one of the following divalent groups: —O—, —$C(CF_3)_2$—, —$SO_2$—, —$C(R^1)_2$—, with $R^1$ being hydrogen, $(C_1-C_6)$-alkyl or fluoroalkyl having from 1 to 4 carbon atoms in the alkyl group or —Z—$AR^1$—Z—, where Z is one of the groups —O— and —$C(CH_3)_2$ or —O—$Ar^1$—Y—$Ar^2$—O—, where Y has the meaning given under Xa) above.

The membrane has pronouned hydrophilic properties and is moreover stable to hydrolyzing agents and oxidants and to the action of heat. It is also resistant to organic solvents and microorganisms and exhibits low adsorption of proteins. A process for producing the membrane and a process for modifying the retention capacity thereof are also described. The membrane is produced by spreading a solution of the homogeneously miscible polymer blend on a planar substrate and precipitating the blend. Retention capacity is modified by heat treatment.

29 Claims, No Drawings

SEMIPERMEABLE MEMBRANE MADE FROM A HOMOGENEOUSLY MISCIBLE POLYMER BLEND

This application is a continuation of application Ser. No. 07/470,211, filed Jan. 25, 1990, now abandoned.

BACKGROUND OF THE INVENTION

The invention relates to a semipermeable membrane made from a homogeneously miscible polymer blend and to a process for its production.

Since the introduction of asymmetric membranes made from cellulose acetate by Loeb and Sourirajan (S. Sourirajan, Reverse Osmosis, Logos Press, London 1970) and made from hydrophobic polymers (U.S. Pat. No. 3,615,024), numerous membranes, in particular for separations of low-molecular weight and macromolecular components dissolved in water, have been developed and proposed, and their structure and suitability have been described in the literature (Desalination, 35 (1980), 5-20). They have also been successfully tested in industry or for medical purposes.

Many of the membranes described have particularly advantageous properties for achieving specific objectives. As a consequence of their chemical and physical structure, each of the individual membranes can only be optimally suitable for very specific separation problems. This gives rise to the basic need for always developing new membranes for new problems.

EP-A-0 082 433 gives a clear description of the advantages and disadvantages of already known membranes. Thus, there are, for example, hydrophilic, asymmetric membranes made from cellulose acetate which have satisfactory antiadsorptive properties, but which leave much to be desired with respect to their thermal and chemical resistance. Membranes made from polysulfones or similar polymers may have good thermal and chemical resistance. There is, however, a pronounced tendency in membranes of this type, due to the hydrophobic properties of the polymers employed, to adsorb dissolved substances, causing the membrane to become more or less blocked. Although the mixtures of polysulfone and polyvinylpyrrolidone described in EP-A-0 082 433 eliminate the disadvantage caused by the hydrophobic character of polysulfone, these mixtures are, however, sensitive to the influence of organic solvents. There are also problems when these membranes are used for the treatment of waste water, because so-called silicone defoamers which may be present in the waste water will block the membranes.

U.S. Pat. No. 4,051,300 describes mixtures of aromatic polyamides with polyvinylpyrrolidone. However, the polyamides are said to have a limited compatibility with the polyvinyl pyrrolidone. These membranes still need improving with respect to their hydrophilic character.

Hydrophilic character and simultaneous resistance to solvents are found in membranes of regenerated cellulose; however, these can be hydrolyzed relatively easily in acidic or alkaline media, and, in addition, they are easily attacked by microorganisms.

SUMMARY OF THE INVENTION

Accordingly, it is an object of the present invention to provide a semipermeable membrane which has pronounced hydrophilic properties, i.e. is capable of absorbing considerable amounts of water, relative to its total weight.

Another object of the present invention is to provide a semipermeable membrane which is stable to hydrolyzing agents and oxidants, is thermally stable, displays improved resistance to organic solvents in comparison to membranes made from a hydrophobic polymer, exhibits low adsorption of proteins, has good wettability, and is insensitive to the action of microorganisms.

A further object of the present invention is to provide a process for producing the foregoing membrane.

Yet another object of the present invention is to provide a process for modifying the retention capacity of the foregoing membrane.

In accomplishing the foregoing objectives, there has been provided, in accordance with one aspect of the present invention, a semipermeable membrane comprising a homogeneously miscible polymer blend which comprises an aromatic polyamide and polyvinyl pyrrolidone.

The aromatic polyamide is in particular formed of the following general, recurrent structural units of the formula I:

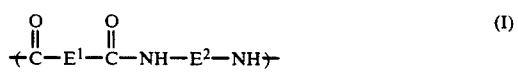

wherein $E^1$ and $E^2$ are identical or different and are selected from the groupings

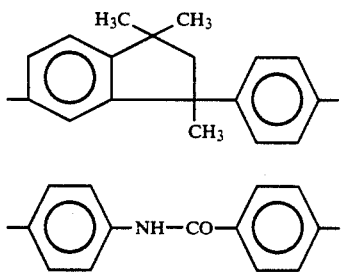

—$Ar^1$—, and

—$Ar^1$—X—$Ar^2$, where $Ar^1$ and $Ar^2$ are the same or different 1,2-phenylene, 1,3-phenylene or 1,4-phenylene groups which may be substituted by ($C_1$-$C_6$)-alkyl, ($C_1$-$C_6$)-alkoxy, —$CF_3$ or halogen and X denotes a) a direct bond or one of the following divalent groups: —O—, —C($CF_3$)$_2$—, —$SO_2$—, —CO—, —C($R^1$)$_2$—, with $R^1$ being hydrogen, ($C_1$-$C_6$)-alkyl or fluoroalkyl having from 1 to 4 carbon atoms in the alkyl group or b) —Z—$Ar^1$—Z—, where Z is one of the groups —O— and —C($CH_3$)$_2$— or c) —O—$Ar^1$—Y—$Ar^2$—O—, where Y has the meaning given under Xa) above.

In accordance with another aspect of the present invention there is provided a process for the production of a membrane as described above, which comprises the steps of: providing a solution comprising a solvent and the foregoing homogeneously miscible polymer blend, wherein said solvent comprises an aprotic, polar solvent of the amide type; spreading the solution as a liquid layer on a planar substrate; and applying to the liquid layer a precipitation liquid which is miscible with the solvent of the solution but in which the dissolved homogeneously miscible polymer blend is precipitated as a membrane.

In accordance with yet another aspect of the present invention, there is provided a process for modifying the retention capacity of a membrane formed by the foregoing process, wherein the membrane, in which virtually all the solvent has been replaced by precipitation liquid, is subjected to heat treatment. Preferably, the heat treatment is carried out in a liquid or with steam.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The aromatic polyamide which is appropriately employed for the membrane according to the invention may be in the form of a random copolymer and also in the form of a block copolymer or a graft copolymer.

Compounds which are suitable for the preparation of the aromatic polyamides comprising recurrent structural units of the formula I are, in particular, as follows:

Suitable dicarboxylic acid derivatives of the formula $$Cl\text{---}CO\text{---}Ar^1\text{---}CO\text{---}Cl$$

are, for example, 4,4'-diphenyl sulfone dicarbonyl dichloride, 4,4'-diphenyl ether dicarbonyl dichloride, 4,4'-diphenyldicarbonyl dichloride, 2,6-naphthalenedicarbonyl dichloride, isophthaloyl dichloride, but very particularly terephthaloyl dichloride and substituted terephthaloyl dichloride, for example 2-chloroterephthaloyl dichloride.

Suitable aromatic diamines of the structure $H_2N\text{---}Ar^1\text{---}NH_2$ comprise m-phenylenediamines or substituted phenylenediamines, for example 2-chlorophenylenediamine, 2,5-dichlorophenylenediamine or 2-methoxy-p-phenylenediamine, in particular p-phenylenediamine.

Suitable substituted benzidine derivatives include 3,3'-dimethoxybenzidine, 3,3'-dichlorobenzidine, 2,2'-dimethylbenzidine and, preferably, 3,3'-dimethylbenzidine.

Suitable diamine components of the formula $$H_2N\text{---}Ar^1\text{---}X\text{---}Ar^2\text{---}NH_2$$

are, for example: 4,4'-diaminobenzophenone, bis(4-aminophenyl)-sulfone, bis[4-(4'-aminophenoxy)phenyl]-sulfone, 1,2-bis(4'-aminophenoxy)-benzene, 1,4-bis[(4'-aminophenyl)isopropyl]-benzene, 2,2'-bis[4-(4'-aminophenoxy)phenyl]-propane, in particular, 1,4-bis-(4'-aminophenoxy)-benzene and mixtures of the diamines mentioned.

Blends which are advantageously used for preparing preferred embodiments of membranes according to the invention include blends wherein the grouping $E^1$ comprises identical or different structural units and denotes a 1,3- or 1,4-phenylene group or the group

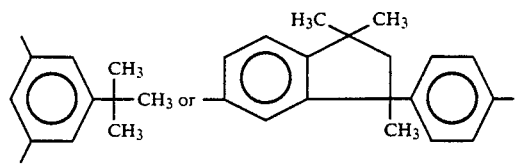

Blends wherein the grouping $E^2$ comprises identical or different structural units and denotes the 1,4-phenylene group or the group

wherein $R^2$ denotes a lower alkyl or alkoxy group having up to 4 carbon atoms each in the alkyl group or F, Cl or Br or the group

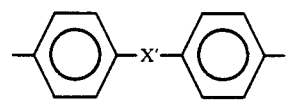

in which X' is the group $\text{---}C(R^1)_2\text{---}$, with $R^1$ being hydrogen or ($C_1\text{-}C_4$) alkyl, or the grouping

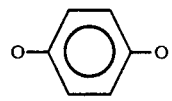

are also preferred.

Blends comprising
a) poly-N-vinylpyrrolidone and
b) at least one copolyaramide having at least three randomly recurring structural units of the formula I, wherein
$E_1$ is a divalent p-phenylene group,
$E_2$ in the three recurrent structural units is one each of a divalent p-phenylene group, a group of the formula

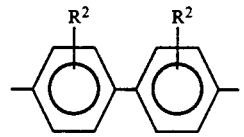

with $R^2$ being $\text{---}CH_3$, $OCH_3$, F, Cl or Br, and a group of the formula

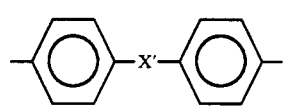

in which X' has the above-indicated meaning, are preferred, as are blends wherein the copolyaramide has the recurrent structural units

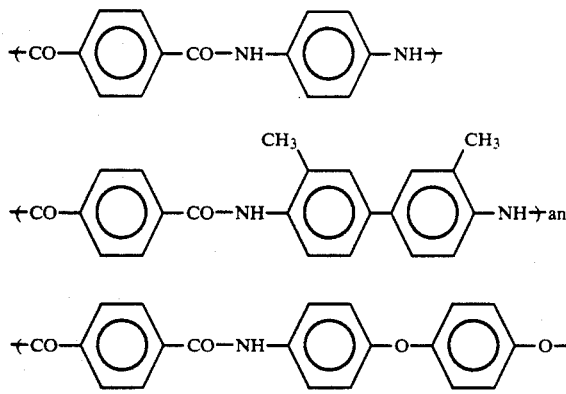

Polyaramides can be prepared in a known manner by solution condensation, interfacial condensation or melt condensation.

The solution condensation of the aromatic dicarboxylic acid dichlorides with the aromatic diamines is carried out in aprotic, polar solvents of the amide type, such as, for example, in N,N-dimethylacetamide or in particular in N-methyl-2-pyrrolidone. If appropriate, halide salts from the first and/or the second group of the periodic table can be added to these solvents in a known manner in order to increase the dissolving power or to stabilize the polyamide solutions. Preferred additives are calcium chloride and/or lithium chloride.

The polycondensation temperatures are usually between about $-20°$ C. and $+120°$ C., preferably between $+10°$ C. and $+100°$ C. Particularly good results are achieved at reaction temperatures between $+10°$ C. and $+80°$ C. The polycondensation reactions are preferably carried out in a manner such that about 2 to 30% by weight, preferably 6 to 15% by weight, of polycondensate are present in the solution after completion of the reaction.

The polycondensation can be stopped in a customary manner, for example by adding monofunctional compounds such as benzoyl chloride.

After completion of the polycondensation, i.e. when the polymer solution has reached the Staudinger index necessary for further processing, the hydrogen chloride which has been produced and is loosely bound to the amide solvent is neutralized by addition of basic substances. Examples of suitable substances for this purpose are lithium hydroxide and calcium hydroxide, and in particular calcium oxide.

The Staudinger index is a measure of the mean chain length of the polymers produced.

The Staudinger index of the membrane-forming aromatic polyamides should be between about 50 and 1,000 cm³/g, preferably between 100 and 500 cm³/g, particularly preferably between 150 and 350 cm³/g. It was determined on solutions each containing 0.5 g of polymer in 100 ml of 96% strength sulfuric acid at 25° C.

The Staudinger index $[\eta]$ (intrinsic viscosity) is taken to mean the term $$\lim_{C_2 \to 0} \frac{\eta_{sp}}{C_2} = [\eta]$$

where $$\eta_{sp} = \text{specific viscosity} = \frac{\eta}{\eta_1} - 1$$

$C_2$ = concentration of the dissolved substance
$\eta$ = viscosity of the solution
$\eta_1$ = viscosity of the pure solvent.

The blends according to the present invention can be prepared in a customary manner from a common solution of PVP and a polyaramide in an aprotic organic solvent, for example, dimethylformamide, dimethylsulfoxide, N-methylpyrrolidone or N,N-dimethylacetamide. The following methods can, for example, be chosen:

1.
   a) Polycondensation of a polyaramide by means of solution condensation, interfacial condensation or melt condensation,
   b) dissolving the resulting polyaramide,
   c) dissolving PVP and
   d) thereafter mixing the PVP solution with the polyaramide solution.

2.
   a) Solution condensation of a polyaramide and
   b) subsequently adding dry PVP or a solution of PVP directly to the composition for polycondensation.

3. It has surprisingly been found that the solution condensation of a polyaramide can take place in the presence of PVP and that homogeneous mixtures can thus also be obtained. The diamines are dissolved together with PVP and a PVP/polyaramide solution is condensed by the addition of dicarboxylic acid dichlorides.

By removing the solvent, e.g. by evaporation, the blends can be isolated and further processed into intermediate products (granules or powder) which can then be used as raw materials for the production of membranes.

The molecular weight of the PVP, specified as the mean weight, is generally about 1,000 to 3,000,000, preferably about 40,000 to 200,000, in particular about 50,000 to 100,000.

The blends of the present invention are homogeneously miscible in any mixing ratio. They contain, in particular, PVP in quantities ranging from about 1 to 80% by weight, preferably from 5 to 60% by weight and particularly preferably from 10 to 50% by weight, relative to the sum of components (a+b).

The polymer blends described above are not as such the subject matter of the present invention; rather, they are described in detail in connection with moldings, in a patent application of the same priority date. Instead, the invention relates to a semipermeable membrane containing the polymer blend mentioned as the principal component.

In order to produce the membrane according to the invention from the polymer blend, the above-described solution of the blend is filtered and degassed, and a semipermeable membrane is then produced in a known manner by phase inversion (Robert E. Kesting, "Synthetic Polymeric Membranes", 2nd Ed., 1985, p. 237 et seq.). To this end, the polymer solution is spread as a liquid layer on a substrate which is as planar as possible. The planar substrate can comprise, for example, a glass plate or a metal drum.

A precipitation liquid which is miscible with the solvent of the solution, but in which the polymers dissolved in the polymer solution are precipitated as a membrane is then allowed to act on the liquid layer. An example of a precipitation liquid used is water. Due to the action of the precipitation liquid on the liquid layer comprising the polymer solution, the substances dissolved therein precipitate to form a semipermeable membrane.

When carrying out the process, the precipitation liquid is advantageously allowed to act on the membrane precipitated thereby until virtually all the solvent has been replaced by precipitation liquid. The membrane formed is then freed from precipitation liquid, for example by drying the membrane directly in a stream of air or alternatively by first treating the membrane with a plasticizer, such as glycerol, and then drying it.

To produce membranes which are arranged on a support layer which is permeable to flowable media, the above-mentioned procedures are followed, but a non-woven, for example made of plastic, or a paper is used as the substrate to form the membrane layer and serves as a support for the latter, and the membrane layer formed is left on this substrate. However, it is also possible first to produce the membrane without a support and only then to apply it to a permeable support.

Hollow filaments or capillaries can also be produced in a known manner from the solution of the polymer blend by spinning the polymer solution in accordance with the prior art through an appropriately constructed shaping annular die or hollow-needle nozzle into the precipitation liquid. According to the prior art, the production conditions can here be chosen in such a way that an external skin or an internal skin or both are formed. The wall thickness of capillaries or hollow fibers of this type is usually in the range from about 20 to 500 μm.

If the membrane is impregnated with glycerol after coagulation, it can preferably contain in the range from about 5 to 60% glycerol, based on its total weight; the membrane impregnated in this way is dried, for example at a temperature of 50° C.

The membrane according to the invention is likewise suitable as a support membrane for permselective layers produced directly on or in the membrane. Thus, for example, "ultrathin" layers (<1 μm) made from polymers containing functional groups (for example silicones, cellulose ethers or fluorinated copolymers) can be spread on water, applied therefrom onto the membrane surface and bound covalently, for example by reaction with a diisocyanate, in order to thus achieve higher permselectivities. Analogously, the membrane according to the invention is also suitable as a support for reactive molecules, for example in order to immobilize enzymes or anticoagulants such as heparin in accordance with the prior art.

The thickness of the membrane according to the invention without a support layer is in the range from about 10 to 300 μm, in particular 20 to 120 μm.

The invention is described in greater detail below with reference to illustrative embodiments, but without the embodiments given therein representing a limitation.

EXAMPLES 1 TO 7

For the production of the membranes investigated in the examples, copolyaramide I was first prepared in N-methylpyrrolidone as solvent from
(A') about 95 to 100 mol-% of terephthaloyl dichloride (TPC),
(B') 25 mol-% of para-phenylenediamine (PPD),
(C') 50 mol-% of 3,3'-dimethylbenzidine (DMB) and
(D') 25 mol-% of 1,4-bis-(4-aminophenoxy)benzene (BAPOB) at a temperature of 50° C.

In the same way, polyaramide II was prepared from about 95 to 100 mol-% of terephthaloyl dichloride and 100 mol-% of bis[4-(4-aminophenoxy)-phenyl]sulfone.

After neutralizing with 100 mol-% of CaO various quantities of poly-N-vinylpyrrolidone in a solid state were added with stirring to these solutions. The resulting clear solutions having various Staudinger indices and with various concentrations (for more precise data see Table 1) were then applied to a polypropylene support non-woven (obtainable from Messrs. Freudenberg: FO 2430 ® 100 g/m$^2$) using a casting device in accordance with U.S. Pat. No. 4,229,291, and coagulated in water at 14° C. The membranes were then impregnated with an aqueous solution of 40% by weight of glycerol and dried at 50° C. The dry support-reinforced membranes had a thickness of 280 μm.

Surprisingly, the membrane properties can subsequently be modified by heat-treating the membrane. In Examples 2 and 4, it is shown how it is possible to substantially increase the retention capacity for dissolved substances by placing the membrane in hot water (100° C.).

The membrane properties of the membranes produced in this way are given in Table 1 below.

The Staudinger index for the aromatic polyaramide was determined in 96% strength H$_2$SO$_4$ at 25° C. as specified in the description.

The mechanical permeability (ultrafiltration) and the retention capacity for dissolved macromolecules were determined in a stirred cylindrical cell (700 rpm, 350 ml, membrane surface area 43 cm$^2$) at pressures of 3.0 bar at 20° C. The retention capacity is defined as $$R = \frac{c_1 - c_2}{c_1} \cdot 100 \, [\%]$$

$c_1$ is the concentration of the aqueous test solution, $c_2$ is the concentration in the permeate.

The test solution employed was a 2% strength aqueous polyvinylpyrrolidone solution (PVP), obtainable under the name "Kollidon K30" ® from Messrs. BASF, and the molecular weight of the polyvinylpyrrolidone was 49,000 Daltons.

The concentrations were measured in a digital densitometer "DMA 60+601" ® from Messrs. Heraeus.

TABLE 1

| Example | Polyaramide | Staudinger Index of Polyaramide (ml/g) | Polymer Concentration (%) | Concentration of PVP (%) | Concentration of CaCl$_2$ (%) | Mechanical Permeability (l/m$^2$ · h) | Retention Capacity (%) | Test Substance |
|---|---|---|---|---|---|---|---|---|
| 1 | Copolyaramide I | 188 | 6.0 | 4.0 (K30) | 2.8 | 460 | 87 | PVP K30 |
| 2[a] | Copolyaramide I | 188 | 6.0 | 5.2 (K30) | 2.8 | 170 | 95 | PVP K30 |
| 3 | Copolyaramide I | 220 | 7.0 | 3.1 (K30) | 3.2 | 105 | 71 | Dex T10[c] |
| 4[b] | Copolyaramide I | 220 | 7.0 | 6.0 (K30) | 3.2 | 75 | 97 | Dex T10[c] |
| 5 | Copolyaramide I | 250 | 6.0 | 3.9 (K30) | 3.0 | 265 | 89 | PVP K30 |
| 6 | Copolyaramide I | 188 | 5.0 | 5.2 (K90) | 2.4 | 360 | 78 | PVP K30 |
| 7 | Polyaramide II | 155 | 8.0 | 5.8 (K30) | 1.6 | 680 | 73 | PVP K30 |

All concentrations given in percent by weight/total weight of solution
[a] thermal post-treatment: 1 h in water at 100° C.
[b] thermal post-treatment: 9 h in water at 100° C.
[c] Dextran 10,000 (Pharmacia)

EXAMPLES 8 TO 10

In order to test the solvent resistance of the membranes according to the invention, the membranes of Examples 1 to 3 were placed in acetone for 1 hour in order to replace the liquid present in the membrane pores by acetone. The membranes were then exposed to the solvents given in Table 2 for a period of 12 hours at a temperature of 25° C. The membranes were then reconditioned to water, and the mechanical permeability and the retention capacity of the membranes treated with the organic solvents were then measured as stated under Example 1. The results are given in Table 2 and show that the differences from the values given in Table 1 are within the tolerance limits of the measurement method.

TABLE 2

| Example | Membrane from Example | Solvent | Mech. Permeability (l/m$^2$ · h) | Retention Capacity (%) | Test Substance |
|---|---|---|---|---|---|
| 8 | 1 | toluene | 340 | 88 | PVP K30 |
| 9 | 2 | CHCl$_3$ | 150 | 95.5 | PVP K30 |
| 10 | 3 | ethyl acetate | 95 | 69 | DEXTRAN T10 |

EXAMPLES 11 TO 17

Aqueous solutions (0.05%) of the colored protein cytochrome C in a stirred cell were subjected to ultrafiltration using the membranes of Examples 1 to 7. After a test period of 30 minutes, the membranes were thoroughly washed with a buffer solution (pH 6.8). The membranes did not show any staining with red cytochrome C, which indicated a low adsorption of proteins.

Membranes having the same molecular weight cut-off, but which were made from various aromatic polyamides or polysulfone, on the other hand, exhibited a strong adsorption of proteins.

What is claimed is:

1. A semipermeable membrane comprising a homogeneously miscible polymer blend, wherein said homogeneously miscible polymer blend comprises (i) a homo- or copolyaramide comprising at least one recurrent structural unit of the formula I

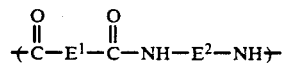
(I)

wherein E$^1$ and E$^2$ are identical or different and are selected from the groupings

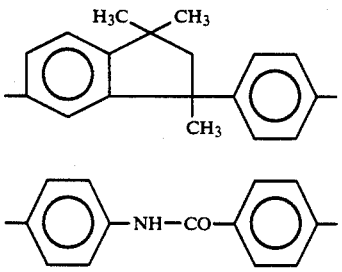

—Ar$^1$—, and
—Ar$^1$—X—Ar$^2$, where in E$^1$ Ar$^1$ and Ar$^2$ are the same or different 1,4-phenylene groups which may be substituted by (C$_1$-C$_6$)-alkyl, (C$_1$-C$_6$)-alkoxy, —CF$_3$ or halogen and X denotes a) a direct bond or one of the following divalent groups: —O—, —C(CF$_3$)$_2$—, —SO$_2$—, —CO—, —C(R$^1$)$_2$—, with R$^1$ being hydrogen, (C$_1$-C$_6$)-alkyl or fluoroalkyl having from 1 to 4 carbon atoms in the alkyl group, or b) —Z—Ar$^1$—Z—, where Z is one of the groups —O— and —C(CH$_3$)$_2$—, or c) —O—Ar$^1$—Y—Ar$^2$—O—, where Y has the meaning given under Xa) above, and in E$^2$ Ar$^1$ and Ar$^2$ are the same or different 1,2-phenylene, 1,3-phenylene or 1,4-phenylene groups which may be substituted by (C$_1$-C$_6$)-alkyl, (C$_1$-C$_6$)-alkoxy, —CF$_3$— or halogen and X denotes d) a direct bond or one of the following divalent groups: —O—, —C(CF$_3$)$_2$—, —SO$_2$—, —CO—, —C(R$^1$)$_2$—, with R$^1$ being hydrogen, (C$_1$-C$_6$)-alkyl or fluoroalkyl having from 1 to 4 carbon atoms in the alkyl group, or e) —Z—Ar$^1$—Z—, where Z is one of the groups —O— and —C(CH$_3$)$_2$—, or f) —O—Ar$^1$—Y—Ar$^2$—O—, where Y has the meaning given under Xd) above, and (iii) polyvinylpyrrolidone having a molecular weight, indicated as the weight average, of about 50,000 to 100,000.

2. A membrane as claimed in claim 1, wherein halogen comprises fluorine, chlorine or bromine.

3. A membrane as claimed in claim 1, wherein the grouping E$^1$ comprises identical or different structural units and denotes a 1,4-phenylene group or the group

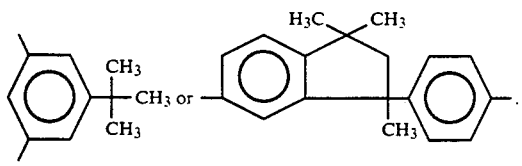
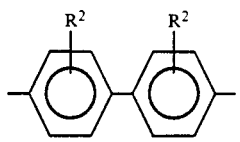

4. A membrane as claimed in claim 1, wherein the grouping $E^2$ comprises identical or different structural units and denotes the 1,4-phenylene group or the group

wherein $R^2$ denotes a lower alkyl or alkoxy group having up to 4 carbon atoms each in the alkyl group or F, Cl or Br or the group

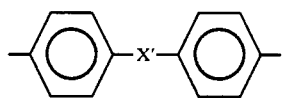

in which X' is the group $—C(R^1)_2—$, with $R^1$ being hydrogen or $(C_1-C_4)$ alkyl, or the grouping

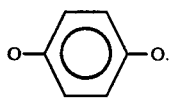

5. A membrane as claimed in claim 1, comprising poly-N-vinylpyrrolidone and
at least one copolyaramide having at least three randomly recurring structural units of the formula I, wherein
$E_1$ is a divalent p-phenylene group,
$E_2$ in the three recurrent structural units is one each of a divalent p-phenylene group, a group of the formula

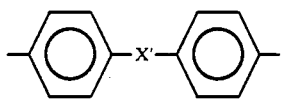

with $R^2$ being $—CH_3$, $—OCH_3$, F, Cl or Br, and a group of the formula

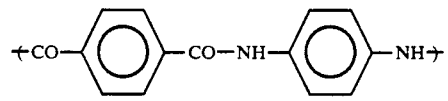

in which X' has the above-indicated meaning.

6. A membrane as claimed in claim 5, wherein the copolyaramide has the recurrent structural units

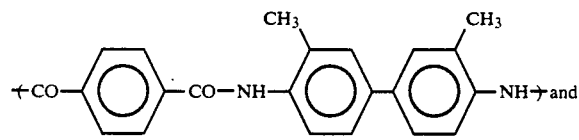

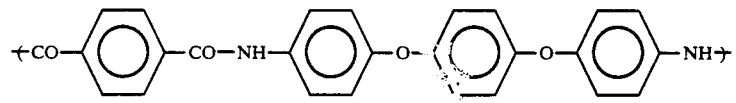

7. A membrane as claimed in claim 1, wherein the aromatic polyamide is a random copolymer, a block copolymer or a graft copolymer.

8. A membrane as claimed in claim 1, wherein the homogeneously miscible polymer blend is prepared by polycondensing aromatic diamines and aromatic dicarboxylic acids or their derivatives which are capable of undergoing polycondensation, in the presence of polyvinylpyrrolidone.

9. A membrane as claimed in claim 1, comprising about 1 to 80% by weight of polyvinylpyrrolidone relative to the sum of components.

10. A membrane as claimed in claim 9, comprising 5 to 60% by weight of polyvinylpyrrolidone, relative to the sum of components.

11. A membrane as claimed in claim 1, which is asymmetric.

12. A membrane as claimed in claim 1, wherein said homogeneously miscible polymer blend consists essentially of the recited ingredients.

13. A membrane as claimed in claim 1, wherein the aromatic polyamide has a Staudinger index of about 50 to 1000 $cm^3/g$.

14. A process for the production of a membrane as claimed in claim 1, which comprises the steps of:
 a) providing a solution comprising a solvent and said homogeneously miscible polymer blend, wherein said solvent comprises an aprotic, polar solvent of the amide type;
 b) spreading said solution as a liquid layer on a planar substrate; and c) applying to said liquid layer a precipitation liquid which is miscible with the solvent of said solution but in which said dissolved homogeneously miscible polymer blend is precipitated as a membrane.

15. A process as claimed in claim 14, wherein said solvent is N,N-dimethylacetamide or N-methyl-2-pyrrolidone.

16. A process as claimed in claim 14, wherein part of said solvent is evaporated prior to coagulation into a membrane.

17. A process as claimed in claim 14, wherein said precipitation liquid is water.

18. A process as claimed in claim 14, wherein said precipitation liquid is allowed to act on the membrane precipitated thereby until virtually all said solvent has been replaced therein by precipitation liquid.

19. A process as claimed in claim 18, wherein said membrane is freed from said precipitation liquid by being dried in a stream of air.

20. A process as claimed in claim 19, wherein said membrane is treated, before drying, with a plasticizer, and is then dried.

21. A process as claimed in claim 20, wherein said plasticizer is glycerol.

22. A process for modifying the retention capacity of a membrane produced by a process as claimed in claim 20, comprising the step of subjecting said membrane to heat treatment in warm air of about 20 to 100% relative atmospheric humidity.

23. A process as claimed in claim 22, wherein said heat treatment is carried out at a temperature of about 60° to 220° C. over a period of about 0.1 to 96 hours.

24. A process as claimed in claim 19, wherein said membrane is dried at a temperature of about 50° C.

25. A process for modifying the retention capacity of a membrane produced by a process as claimed in claim 18, comprising the step of subjecting said membrane to heat treatment.

26. A process as claimed in claim 25, wherein said heat treatment is carried out in a liquid.

27. A process as claimed in claim 26, wherein said liquid is an inert liquid.

28. A process as claimed in claim 25, where heat treatment is carried out with steam.

29. A process as claimed in claim 25, whereon said heat treatment is carried out at a temperature of about 60° to 220° C. over a period of about 0.1 to 96 hours.

* * * * *